United States Patent
Lee et al.

(10) Patent No.: US 6,883,074 B2
(45) Date of Patent: Apr. 19, 2005

(54) SYSTEM AND METHOD FOR EFFICIENT WRITE OPERATIONS FOR REPEATED SNAPSHOTS BY COPYING-ON-WRITE TO MOST RECENT SNAPSHOT

(75) Inventors: Whay Sing Lee, Newark, CA (US); Raghavendra J. Rao, Fremont, CA (US); Fay Chong, Jr., Cupertino, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 236 days.

(21) Appl. No.: 10/319,050

(22) Filed: Dec. 13, 2002

(65) Prior Publication Data

US 2004/0117567 A1 Jun. 17, 2004

(51) Int. Cl.[7] .............................. G06F 12/00
(52) U.S. Cl. ................ 711/162; 711/154; 711/161; 707/204; 714/6
(58) Field of Search .................. 711/162, 154, 711/161; 707/204; 714/6

(56) References Cited

U.S. PATENT DOCUMENTS 5,263,154 A * 11/1993 Eastridge et al. ............ 714/6
5,276,860 A * 1/1994 Fortier et al. ............... 714/6
5,410,667 A * 4/1995 Belsan et al. ............. 711/114
5,720,026 A * 2/1998 Uemura et al. ............. 714/6

* cited by examiner

Primary Examiner—Donald Sparks
Assistant Examiner—Brian R. Peugh
(74) Attorney, Agent, or Firm—Blakely, Sokoloff, Taylor & Zafman (57) ABSTRACT

An embodiment of the invention provides a method for improving efficiency in a system containing repeated snapshots of an original data store. A READ/WRITE enabled parent virtual logical unit (VLU) to store an original data store is created. One or more READ-only enabled child VLUs, each storing a point-in-time copy of the original data store, are created at distinct times. A search pointer and a propagation pointer are implemented on the parent VLU and on each child VLU. The search pointer of each child VLU is set to point to the next subsequently created child VLU, with the search pointer of a most recently created child VLU set to point to the parent VLU. The propagation pointer of each child VLU is set to point to the immediately previously created child VLU, with the propagation pointer of the parent VLU set to point to the most recently created child VLU.

21 Claims, 8 Drawing Sheets

SYSTEM AND METHOD FOR EFFICIENT WRITE OPERATIONS FOR REPEATED SNAPSHOTS BY COPYING-ON-WRITE TO MOST RECENT SNAPSHOT

FIELD

Embodiments of the invention relate generally to the field of data storage and more particularly to methods for efficiently maintaining a set of point-in-time copies (snapshots) of a data store.

BACKGROUND

The continued increase in data storage has been accompanied by an increasing need to have an accurate record of the state of particular data stores at specified times. A snapshot is a point-in-time image of a given data store. Snapshots may be created to effect recovery of data upon a catastrophic failure or to maintain a record of the state of the data at given times. Typical data storage systems may have a capacity of a terabyte (TB) or more. Such storage may be organized as a number of storage units of more practical size known as virtual logical units (VLUs). VLUs have their own well-defined virtual block address (VBA) space, and typically range in size upward from several hundred megabytes (MB). A snapshot may be created for an original VLU (parent VLU) at a user-specified time. The snapshot VLU (child VLU) then contains an exact copy of the parent VLU at the specified time. This child VLU can be accessed and modified just like any other VLU.

A basic approach to creating a snapshot is to make an actual copy of the entire VLU. For example, upon receiving a command to snapshot a VLU, all new data access requests (I/O requests—READs and WRITEs) to that VLU are halted, a child VLU of the same size is created, and the entire content of the parent VLU is copied into the child VLU. Both VLUs are then available to the user. Copying the contents of one VLU to another to create a snapshot is both time-consuming and an inefficient use of storage space. For example, a 1 TB VLU may require several hours or even days to completely copy during which time the parent VLU is unavailable for data access. Moreover, the storage space required for the child VLU is equal to the size of the parent VLU.

Another typical approach is the "copy-on-write" approach, wherein data is not copied immediately when the snapshot command is received. Rather, the existing version of a data block is propagated into the shadow region of a newly created VLU (i.e., child VLU). A variant of this approach is for the system to initiate a background copying operation when the snapshot command is received without accepting new data access requests. In such a system, when a WRITE operation is received, the system first checks to see if the requested data block has already been copied into the child VLU. If the block has not yet been copied to the child VLU, the system explicitly makes the copy before allowing the requested operation to be serviced. A bitmap may be used to keep track of the data blocks that have been copied. A variant of this approach is for the system to initiate a background copy operation when the snapshot command is received without stopping the processing of new data requests. This approach alleviates the problem of the VLU being inaccessible for long periods, but is still space inefficient.

A typical data storage system contains an array of disk drives, a controller for controlling access to the disk array, and a cache memory for storing recently accessed data so as to provide quick access to data that is likely to be accessed in the near-term without having to access the disk on every occasion. Since a particular file or block of data may be located on the disk or in the cache, the storage device typically includes metadata (MD) that registers all data blocks currently in the cache and, therefore, indicates whether a data block is on the disk or stored in cache. If the data block is in the cache, the MD indicates where the data block is stored in the cache. The MD may also indicate the current state of the data block (e.g., whether or not it has been "flushed" to disk). For such a system, another typical approach to creating a snapshot is to create a copy of the MD of the parent VLU when the snapshot command is received. The new copy of MD is then assigned to the child VLU. With this approach, data access to the parent VLU need only be interrupted long enough to make a copy of the MD. That is, because both copies of the MD point to the same data, the child VLU presents an image that is identical to the parent VLU immediately after the MD is copied. Thus both the parent VLU and the child VLU can be made available to the user as soon as the MD is copied. Subsequently, if a WRITE is received for either VLU, the system checks to see if the MD of the child VLU and the MD of the parent VLU for the corresponding VBA are still pointing to the same data blocks. If not, the WRITE operation proceeds normally. Otherwise, a copy of the data block involved is made and linked into the metadata for the child VLU before the WRITE operation is permitted to proceed. A bitmap or scoreboard may be used to keep track of the blocks that have been copied. Alternatively, the MD need not be entirely copied when the snapshot command is received. Instead, space for the MD and the bitmap is allocated, but left empty. A cleared 'copied' bit implicitly indicates that a corresponding MD entry in the child VLU is identical to that in the parent VLU. An MD entry for the child VLU is filled in when the corresponding data block is copied. With such an approach, the time during which data access is interrupted is reduced because only a relatively small amount of information (i.e., the MD) is copied before the VLUs are made available to the user again. Copying only the MD also has the advantage of needing only as much new disk storage space as the amount of changes made to the VLUs after the snapshot is created.

Figure 1:
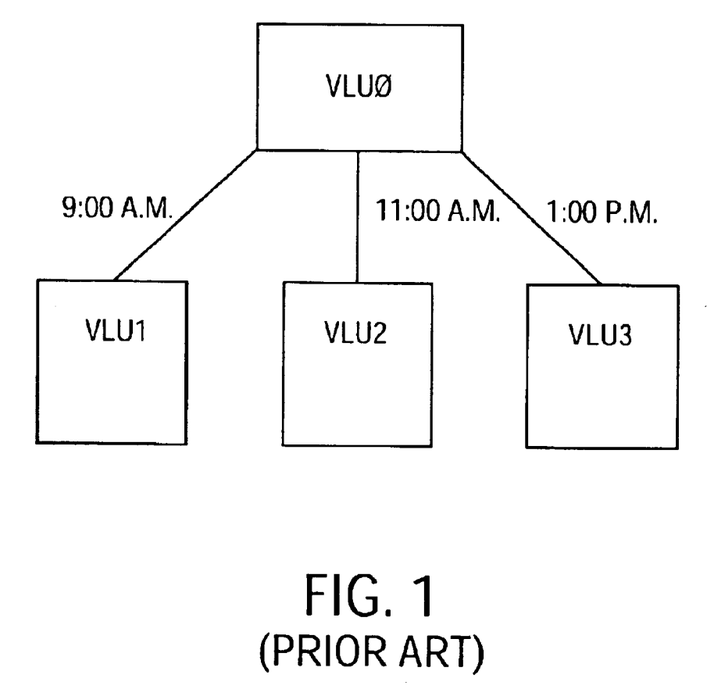
FIG. 1 illustrates an example of a series of repeated snapshots in accordance with the prior art.

These solutions are quite efficient for a small number of snapshots in the system, but less so when multiple (repeated) snapshots are taken of an original VLU. Repeated snapshots find many applications where it is desirable to preserve a timed record of the original data store. FIG. 1 illustrates an example of a series of repeated snapshots of an original data store in accordance with the prior art. In FIG. 1, VLU1 is a snapshot of VLU0 created at 9:00 A.M. VLU2 is a snapshot of VLU0 created at 11:00 A.M, and VLU3 is a snapshot of VLU0 created at 1:00 P.M. Repeated snapshots are often employed in particular data-use situations that share common characteristics. For example, financial records are often copied at fixed time intervals to provide a backup of the original data store at a relatively recent time in the event the original data store becomes inaccessible. Also, such repeated copies provide the ability to audit the records for a given time or date. For such uses these repeated snapshots are typically READ-only copies since the record is used for reproducing the original or verifying the data at a desired time. The more frequently such repeated snapshots are made, the more critical reducing the space of each snapshot becomes. Conversely, frequently repeated snapshots typically have a small delta (the difference between a given snapshot and its immediate predecessor). Prior art copy-on-write methods do not exploit these characteristics to improve the performance of WRITE operations to the parent VLU and provide efficient use of storage capacity.

SUMMARY

An embodiment of the invention provides a method for improving efficiency in a system containing repeated snapshots of an original data store. A READ/WRITE enabled parent virtual logical unit (VLU) to store an original data store is created. One or more READ-only enabled child VLUs each storing a point-in-time copy of the original data store, are created. The one or more child VLUs are created at distinct times. A search pointer and a propagation pointer are implemented on the parent VLU and on each child VLU. The search pointer of each child VLU is set to point to the next subsequently created child VLU, with the search pointer of a most recently created child VLU set to point to the parent VLU. The propagation pointer of each child VLU is set to point to the immediately previously created child VLU, with the propagation pointer of the parent VLU set to point to the most recently created child VLU.

Other features and advantages of embodiments of the invention will be apparent from the accompanying drawings, and from the detailed description, that follows below.

BRIEF DESCRIPTION OF THE DRAWINGS

The invention may be best understood by referring to the following description and accompanying drawings that are used to illustrate embodiments of the invention. In the drawings.

DETAILED DESCRIPTION

Overview

An embodiment of the invention implements a search pointer and a propagation pointer in each VLU in the system. When a new snapshot of an original data store is created (note: snapshots of snapshots (cascaded snapshots) are irrelevant in an environment supporting READ-only snapshots), the search pointer and propagation pointer of the new VLU are set to point to the parent VLU and the immediate predecessor child VLU, respectively. If no immediate predecessor child VLU exists, the propagation pointer is set to NULL. The search pointer of the immediate predecessor child VLU and the propagation pointer of the parent VLU are reset to point to the new child VLU. When a WRITE operation is received by the parent VLU, the current version of the affected data blocks (the history) is copied to the most recently created point-in-time copy (i.e., copied to the "youngest child"). Of course this copying to youngest child VLU is not required if a local copy of the history already exists on the youngest child VLU. The history is not propagated to all child VLUs, thus improving the efficiency of a WRITE operation to the parent VLU. When a READ operation is received by a child VLU, the controller starts by searching the requested child VLU for the requested data blocks. If the requested data is not found, the next subsequently created (immediately younger) child VLU is located by following the search pointer of the requested VLU. If the requested data block is not found, the process is repeated until the requested data block is found in a child VLU or in the parent VLU.

In one embodiment, the search pointer and the propagation pointer are implemented in the VLU in addition to an MD structure (which may include a tree of MD slabs) for each VLU. In such an embodiment, the tree of MD slabs may be organized as described in co-pending U.S. patent application Ser. No. 10/261,545, filed on Sep. 30, 2002. In such organization, the tree of MD slabs may be organized as having a plurality of nodes (slabs), each node containing an MD table. Each of the MD tables has a plurality of entries. Each of the entries in the MD table represents a contiguous range of block addresses and contains a pointer to a cache slot storing a data block corresponding to the block address, or an indicator to indicate that the corresponding data block is not stored in a cache slot. Each MD table also contains a block address range indicator to indicate the contiguous range of block addresses, and at least one pointer to point to any parent or child nodes.

An intended advantage of one embodiment of the invention is to exploit particular data-access patterns of an environment in which multiple child VLUs are READ-only enabled to improve the efficiency of WRITE operations to a parent VLU. Another intended advantage of one embodiment of the invention is to use storage capacity more efficiently by propagating history to only one child VLU (e.g., the youngest child VLU).

In the following description, numerous specific details are set forth. However, it is understood that embodiments of the invention may be practiced without these specific details. In other instances, well-known structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Parent/Sibling Pointer Implementation

Figure 2:
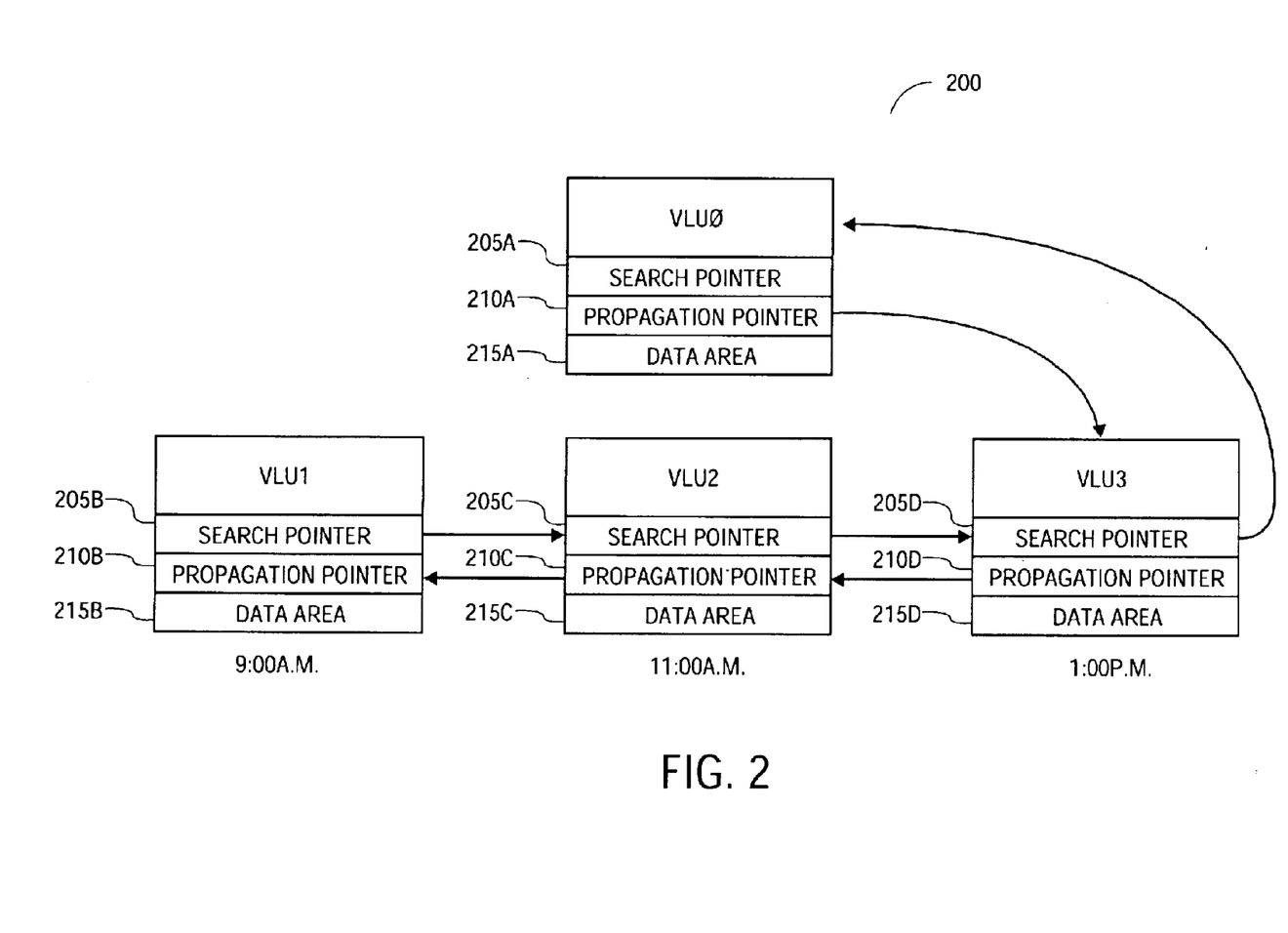
FIG. 2 illustrates a system in which a search pointer and a propagation pointer are implemented in each VLU in accordance with one embodiment of the invention.

FIG. 2 illustrates a system in which a search pointer and a propagation pointer are implemented in each VLU of the system in accordance with one embodiment of the invention. System 200, shown in FIG. 2, includes an original or parent VLU, VLU0, and three repeated snapshots of VLU0, namely VLU1, VLU2 and VLU3. VLUs VLU1, VLU2 and VLU3 were created at distinct points in time (i.e., 9:00 A.M., 11:00 A.M., and 1:00 P.M., respectively). Search pointers 205*a*–205*d* are implemented in VLU0–VLU3, respectively. The search pointers are used to direct the progress of a search upon receipt of a READ operation to a child VLU. Propagation pointers 210*a*–210*d* are likewise implemented in VLU0–VLU3, respectively. The propagation pointers are used to direct the propagation of a history prior to processing a WRITE operation received to the parent VLU. In one embodiment, the search pointer and propagation pointer are implemented within an MD structure of each VLU; this is in addition to the typical information contained within an MD structure (e.g., data block locations, etc.). VLU0–VLU3 also contain data areas 215*a*–215*d*, which store the data for each VLU, respectively. For alternative embodiments data areas 215*a*–215*d* may store data pointers that point to the actual data stored elsewhere.

Figure 3A:
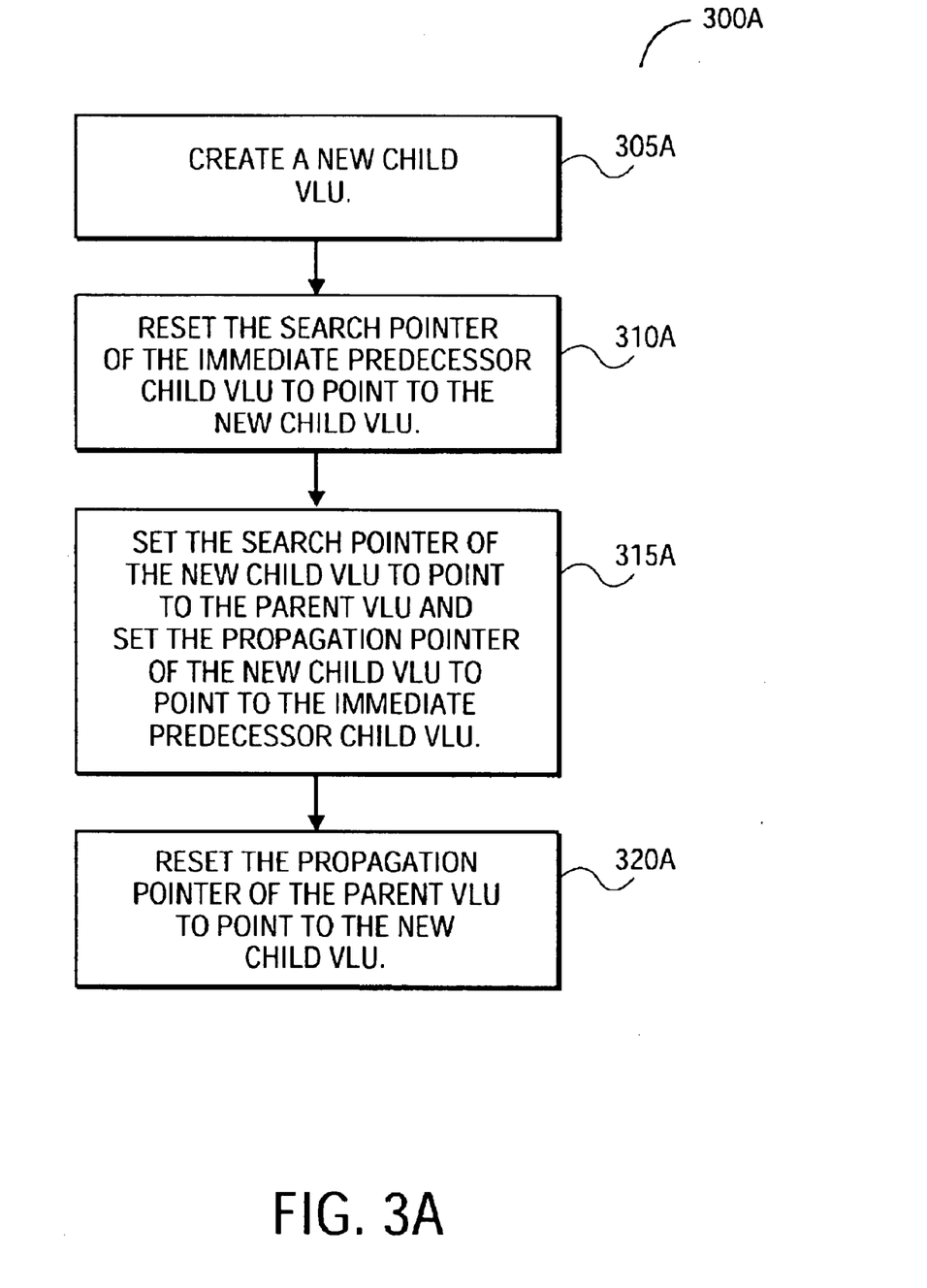
FIG. 3A illustrates a process by which a new snapshot is created of an original data store and the search pointers and propagation pointers are set accordingly in accordance with one embodiment of the invention.

FIG. 3A illustrates a process by which a new snapshot is created of an original data store and the search pointers and propagation pointers are set accordingly. Process 300A, shown in FIG. 3A, begins at operation 305A in which a new snapshot is created for a parent VLU. For example, referring again to FIG. 2, at 1:00 P.M. a new snapshot of VLU0 is created (i.e., VLU3 is created). At operation 310A the search pointer (e.g., 205*c*) of the immediate predecessor child VLU (e.g., VLU2) is reset to point to the new child VLU (e.g., VLU3). The immediate predecessor child VLU can be located by resorting to the propagation pointer of the parent VLU, which, at the time the new child VLU is created, is pointing to the immediate predecessor child VLU. At operation 315A search pointer (e.g., 205*d*) of the new child VLU is set to point to the parent VLU and the propagation pointer (e.g., 210*d*) of the new child VLU is set to point to the immediate predecessor child VLU. At operation 320A the propagation pointer (e.g., 210*a*) of the parent VLU, which had been pointing to the immediate predecessor child VLU is reset to point to the new child VLU.

Write Operation

Figure 3B:
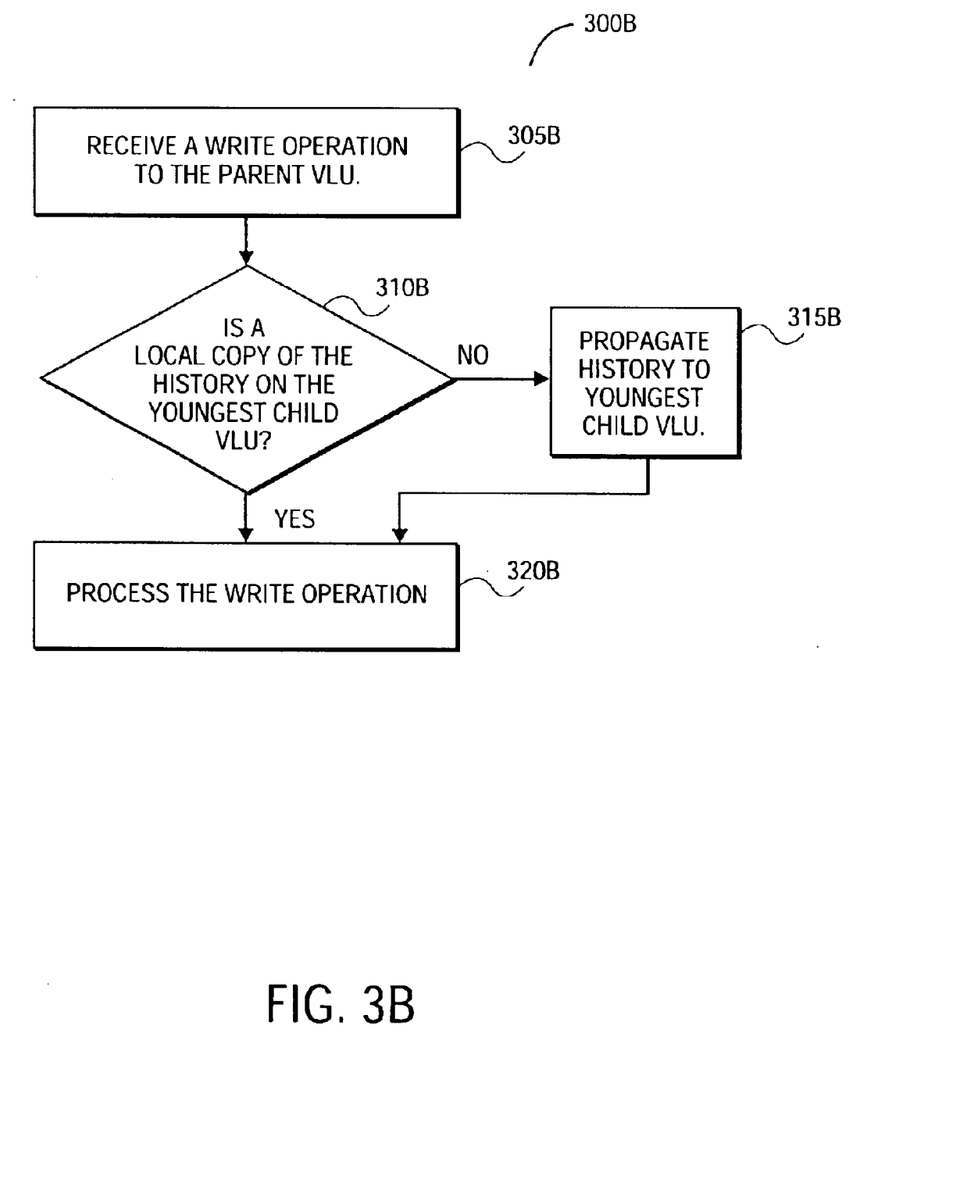
FIG. 3B illustrates a process by which a WRITE operation is received to a parent VLU and the history of the affected data blocks is propagated to the youngest child VLU in accordance with one embodiment of the invention.

For one embodiment, when a WRITE operation is received by the parent VLU, the current version of the affected data blocks (the history) is copied to the most recently created point-in-time copy (i.e., copied to the "youngest child"). There is no need to propagate the history to each child VLU. That is, because the history, once written to a READ-only VLU will not be overwritten, and because the child VLUs are linked, the history need only be propagated to one child VLU, (e.g., the youngest child VLU) prior to processing the WRITE operation. Moreover, prior to propagation, the youngest child VLU is searched to determine if a local copy of the history is already present, and if so, the history need not be copied to the youngest child VLU. Thus performance is improved, as a WRITE operation can be processed more quickly; and capacity is optimized as only one copy of the history is stored. FIG. 3B illustrates a process by which a WRITE operation is received to a parent VLU and the history of the affected data blocks is propagated to the youngest child VLU in accordance with one embodiment of the invention. Process 300B, shown in FIG. 3B, begins at operation 305B in which a WRITE operation is received to a parent VLU, the WRITE operation affecting particular data blocks. At operation 310B, the youngest child VLU is searched to determine if a copy of the history is already present locally on the youngest child VLU. If not, the history is propagated to the youngest child VLU at operation 315B. At operation 320B the WRITE operation is processed. If, at operation 310B, a local copy of the history is found on the youngest child, the WRITE operation may proceed without propagation of the history.

Read Operation

Figure 4:
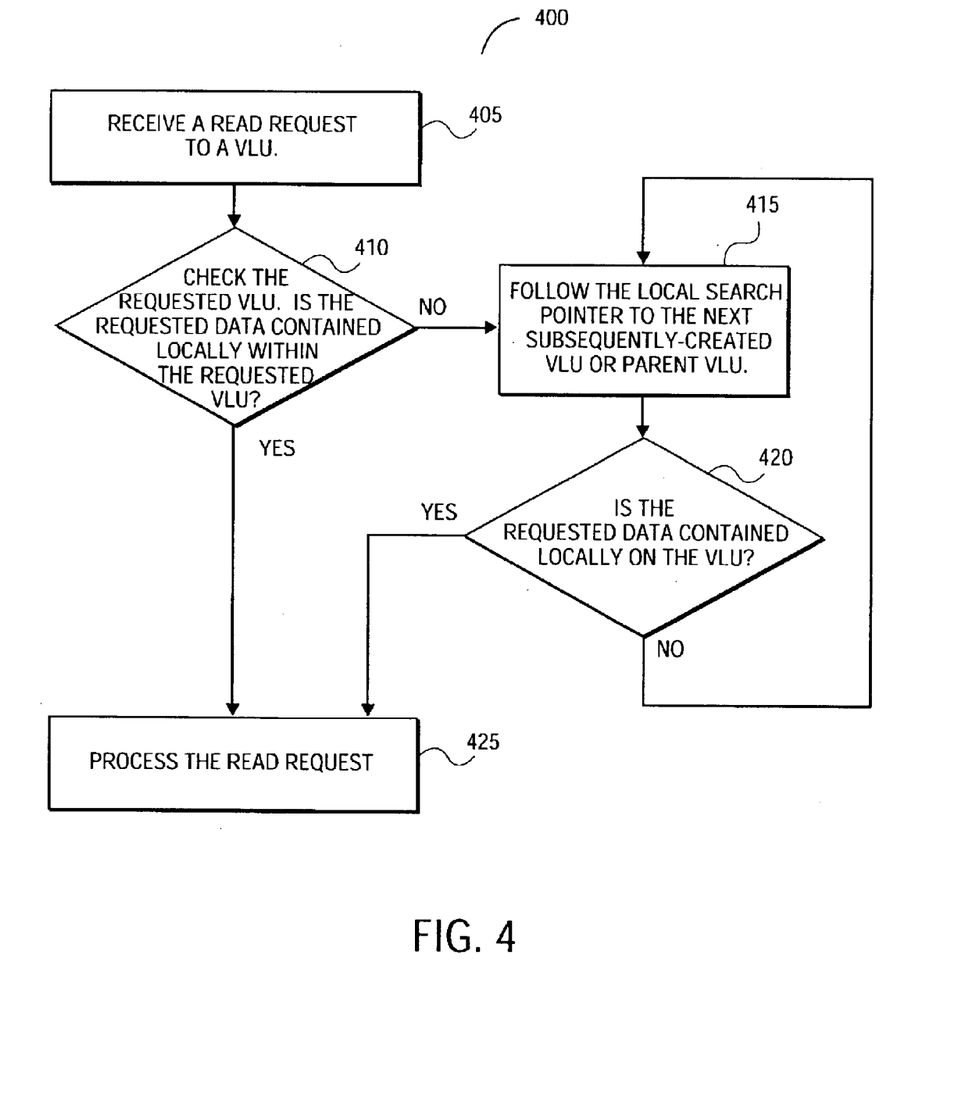
FIG. 4 illustrates a process by which a READ operation to a child VLU is processed in accordance with one embodiment of the invention.

FIG. 4 illustrates a process by which a READ operation to a child VLU is processed in accordance with one embodiment of the invention. Process 400, shown in FIG. 4, begins at operation 405 in which a READ operation is received by a VLU. At operation 410 the controller searches the requested VLU to determine if a local copy of the requested data block already exists in the requested VLU. If not, at operation 415, the controller follows the search pointer implemented within the VLU to the next subsequently-created child VLU or parent VLU. At operation 420 another local search is made and the process is repeated until the requested data block is found in a child VLU or in the parent VLU. At operation 425 the READ request is processed once the requested data block has been located. If, at operation 410, the controller determines that a local copy of the requested data block already exists in the requested child VLU, then the READ request is serviced directly.

Deleting A Child VLU

Figure 5:
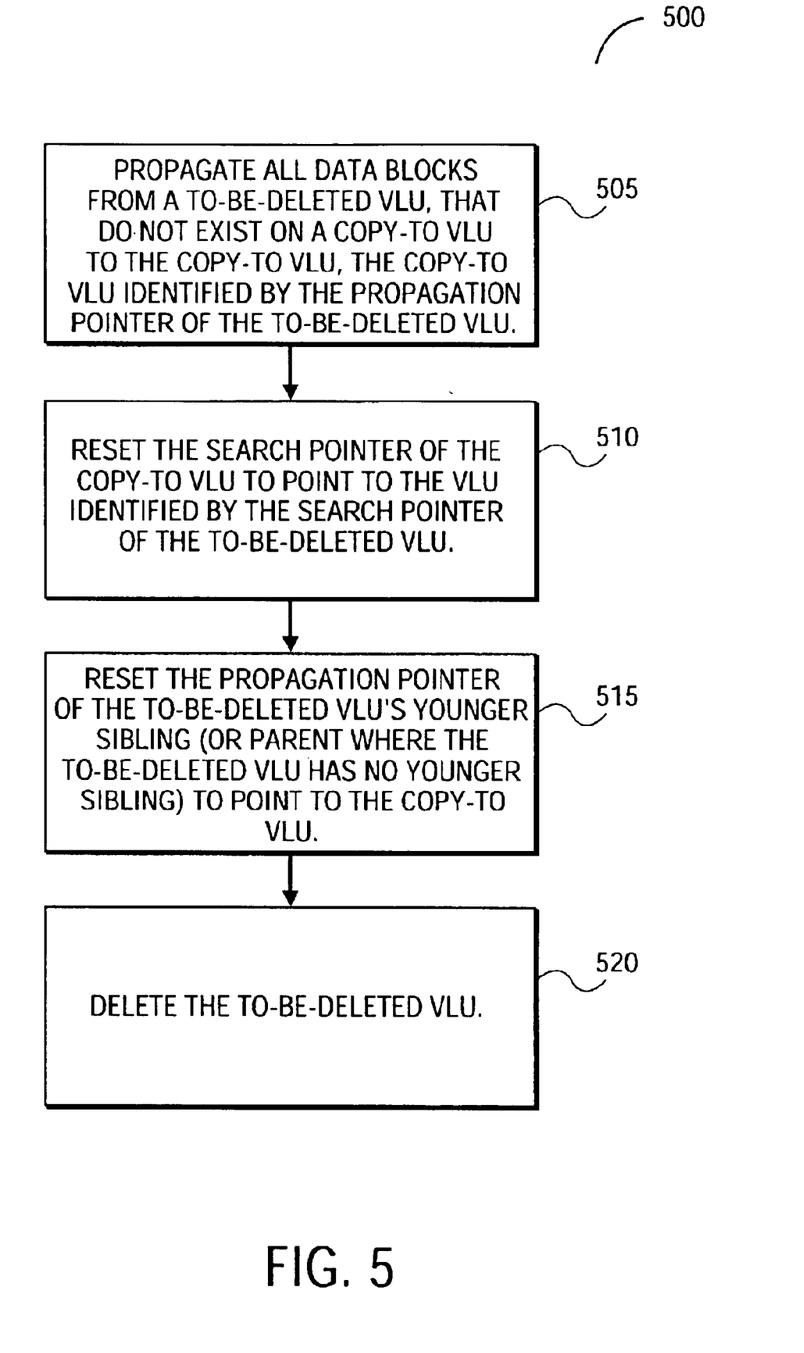
FIG. 5 illustrates a process by which a child VLU is deleted in accordance with one embodiment of the invention.

FIG. 5 illustrates a process by which a child VLU is deleted in accordance with one embodiment of the invention. Process 500, shown in FIG. 5, begins at operation 505 in which every data block of a to-be-deleted VLU (tbdVLU) is propagated to the VLU identified by the propagation pointer of the tbdVLU (copy-to VLU). Of course, data blocks of the tbdVLU that already exist locally at the copy-to VLU must not be propagated.

At operation 510 the search pointer of the copy-to VLU, which was pointing to the tbdVLU, is reset to point to the VLU that the search pointer of the tbdVLU was pointing to. That is, the search pointer of the copy-to VLU is reset to point to the younger sibling of the tbdVLU, or for the case where the tbdVLU was the youngest child VLU, to the parent VLU.

At operation 515 the propagation pointer of the tbdVLU's younger sibling (or the propagation pointer of the parent VLU in the case where the tbdVLU is the youngest child VLU) is reset to point to the copy-to VLU. The propagation pointer of the tbdVLU's younger sibling (or the propagation pointer of the parent VLU) can be set to NULL where the tbdVLU is the oldest child VLU.

At operation 520 the tbdVLU is deleted from the system.

Rollback

Figure 6:
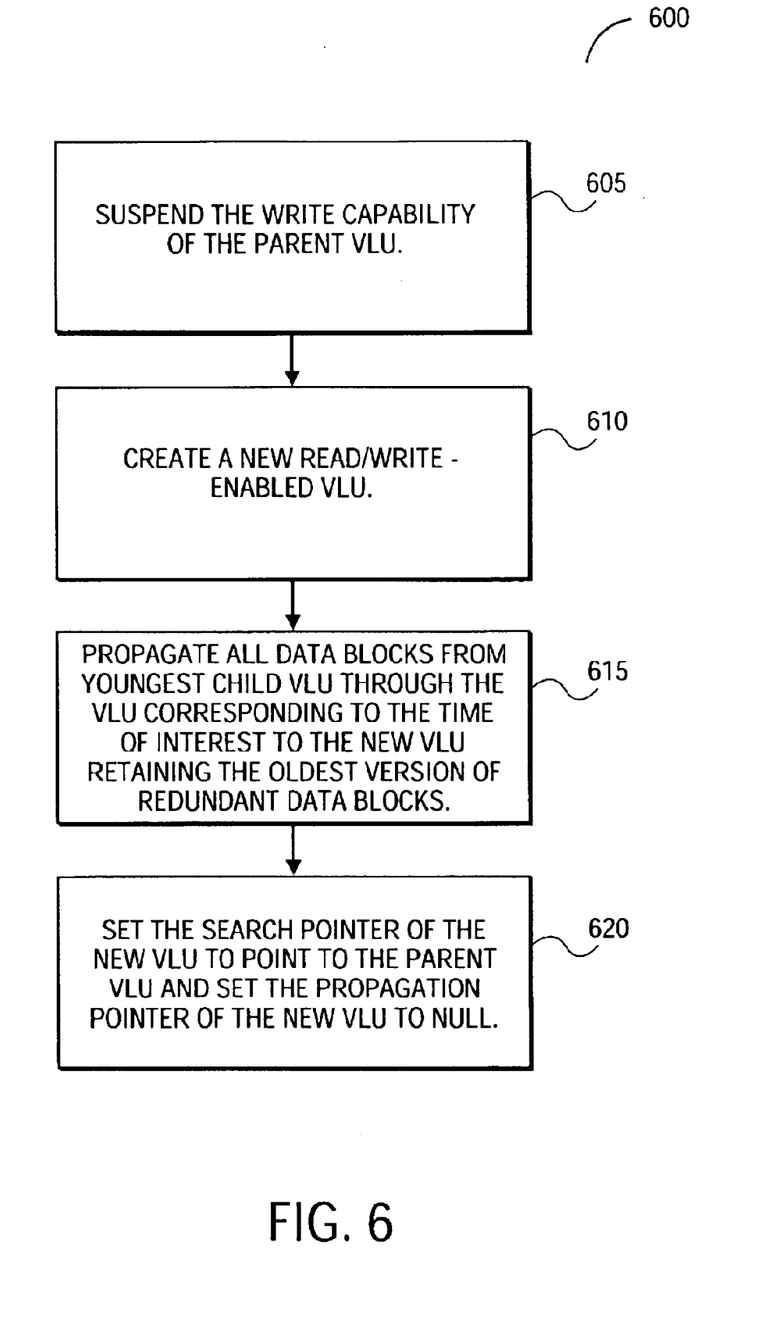
FIG. 6 illustrates a process for creating a "rollback" in a system in which the child VLUs are READ-only VLUs in accordance with one embodiment of the invention.

A typical purpose of creating multiple repeated snapshots is to have available an accurate record of the original data store (contained in the active (parent) VLU) at distinct, previous, times of interest. FIG. 6 illustrates a process for creating a "rollback" in a system in which the child VLUs are READ-only VLUs in accordance with one embodiment of the invention. Process 600, shown in FIG. 6, begins at operation 605 in which the WRITE capability of the parent VLU is suspended (i.e., the parent VLU is made READ-only).

At operation 610 a new VLU is created that is READ/WRITE-enabled.

At operation 615, starting with the youngest child VLU, every data block for which there is a local copy in the child VLU is copied into the new VLU. The process is repeated for successively older child VLUs through the VLU corresponding to the time of interest. If a data block exists in more than one of the child VLUs being copied from, the older versions replace the newer versions within the new VLU such that upon completion the oldest version of a particular data block is retained in the new VLU. In an alternative embodiment the copying process may proceed starting with the VLU corresponding to the time of interest and ending with the youngest child, provided that the oldest version of the data blocks are retained in the new VLU.

At operation 620 the search pointer of the new VLU is set to point to the parent VLU and the propagation pointer of the new VLU is set to NULL. The new VLU can now be used for applications with subsequent WRITE operations updated into the new VLU and subsequent READ operations causing a search to be done first in the new VLU and then in the parent VLU.

For the particular case where all of the child VLUs created subsequent to time of interest are to be deleted, the data blocks from such child VLUs may all be copied to the parent VLU thus creating a rollback without the need to create a new VLU.

Figure 7:
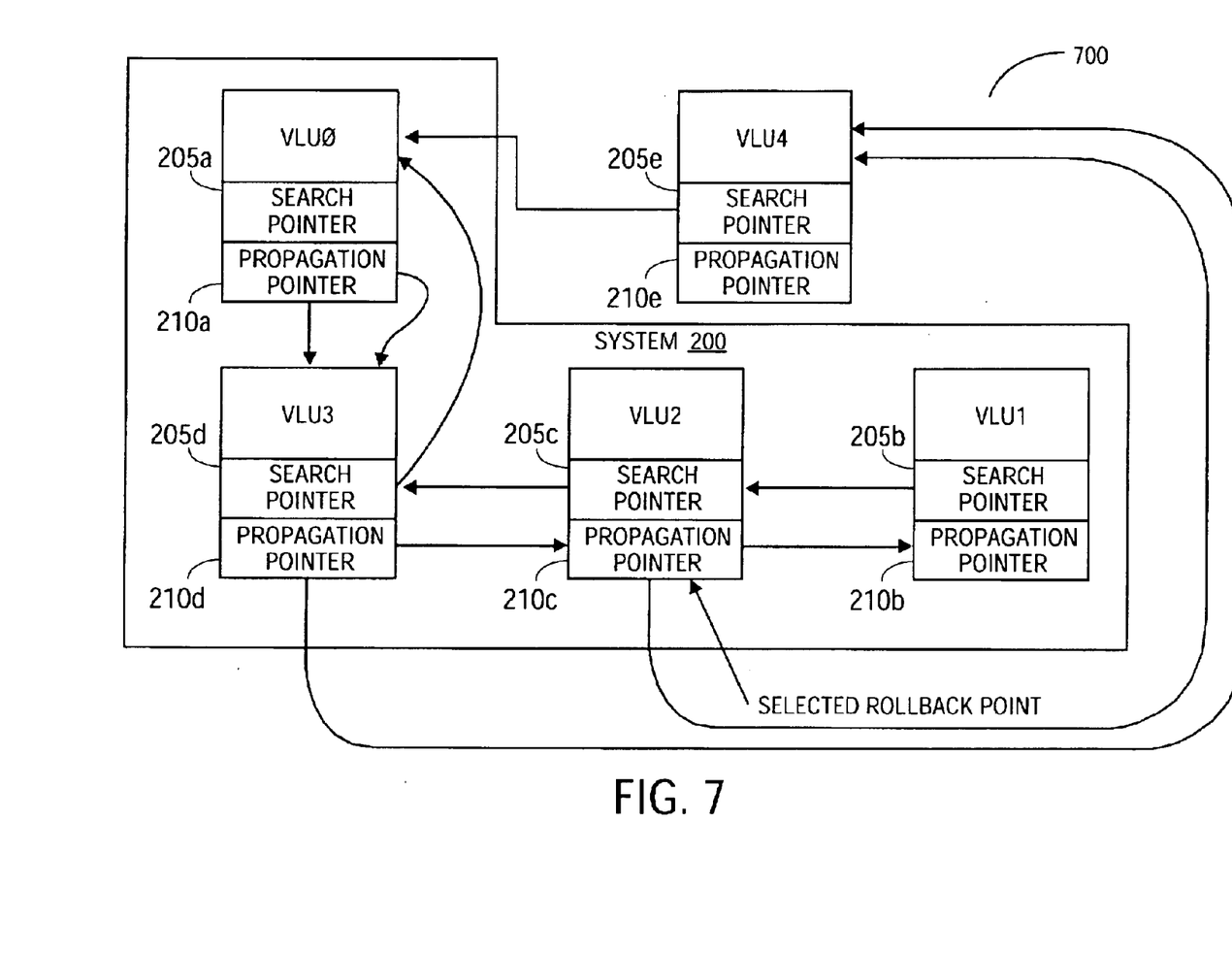
FIG. 7 illustrates a system in which a rollback is accomplished in accordance with one embodiment of the invention.

The process described above in reference to FIG. 6 is illustrated by example in reference to FIG. 7. FIG. 7 illustrates a system in which a rollback is accomplished in accordance with one embodiment of the invention. System 700 includes system 200 of FIG. 2 and a new VLU, namely VLU4. The original parent VLU, VLU0 is now a READ-only VLU and VLU4 is READ/WRITE-enabled. Child VLU2 is the selected rollback point. As described above in reference to FIG. 6, every data block from child VLUs starting with the youngest child, up to and including the selected rollback point, (in this example VLU3 and VLU2), is copied to the new VLU, VLU4. The oldest version of data blocks contained in two or more child VLUs are retained in the new VLU. Search pointer 205e of VLU4 is set to point to VLU0 and propagation pointer 210e of VLU4 is set to NULL. After the consolidation of the history from VLU3 and VLU2 into VLU4, no more than two searches need be performed (i.e., at most a search of VLU4 and VLU0) to locate any data block. Therefore, performance of VLU4 is not significantly degraded. However, if further snapshots are created from VLU4, future rollbacks will expand the search-chain. This expansion can be limited by continually propagating the data blocks of the old parent (e.g., VLU0) into the new READ/WRITE-enabled VLU (e.g., VLU4). Such propagation should be done after all child VLUs of the old parent have been deleted because the parent VLU contains a point-in-time copy of the original data store on which the child VLUs are dependent. Rollbacks are typically infrequent, so this propagation process may be accomplished as a background operation, thus avoiding any significant degradation of system performance.

General Matters

Embodiments of the invention may be implemented to reduce the time between when a WRITE operation is received to a parent VLU and when the WRITE can be processed. The history may be propagated to only one child. In one embodiment, the history is propagated to the youngest child. This limited propagation improves the performance of WRITE operations to the parent VLU at the expense of WRITE capability to the child VLUs. Furthermore, because less data is being stored, the present invention provides more efficient use of storage capacity.

The invention includes various operations. It will be apparent to those skilled in the art that the operations of the invention may be performed by hardware components or may be embodied in machine-executable instructions, which may be used to cause a general-purpose or special-purpose processor or logic circuits programmed with the instructions to perform the operations. Alternatively, the operations may be performed by a combination of hardware and software. The invention may be provided as a computer program product that may include a machine-readable medium having stored thereon instructions, which may be used to program a computer (or other electronic devices) to perform a process according to the invention. The machine-readable medium may include, but is not limited to, floppy diskettes, optical disks, CD-ROMs and magneto-optical disks, ROMs, RAMs, EPROMs, EEPROMs, magnet or optical cards, flash memory, or other type of media/machine-readable medium suitable for storing electronic instructions. Moreover, the invention may also be downloaded as a computer program product, wherein the program may be transferred from a remote computer to a requesting computer by way of data signals embodied in a carrier wave or other propagation medium via a communication cell (e.g., a modem or network connection).

While the invention has been described in terms of several embodiments, those skilled in the art will recognize that the invention is not limited to the embodiments described, but can be practiced with modification and alteration within the spirit and scope of the appended claims. The description is thus to be regarded as illustrative rather than limiting.

What is claimed is:

1. A method comprising:

creating a READ/WRITE enabled parent virtual logical unit (VLU) to store an original data store;

creating one or more READ-only enabled child VLUs each storing a point-in-time copy of the original data store, the one or more child VLUs created at distinct times;

implementing a search pointer and a propagation pointer on the parent VLU and on each child VLU;

setting the search pointer of each child VLU to point to the next subsequently created child VLU, and set the search pointer of a most recently created child VLU to point to the parent VLU; and setting the propagation pointer of each child VLU to point to the immediately previously created child VLU, and set the propagation pointer of the parent VLU to point to the most recently created child VLU.

2. The method of claim 1 further comprising:

receiving a WRITE operation to the parent VLU, the WRITE operation affecting one or more data blocks of the parent VLU;

following the propagation pointer of the parent VLU to the most recently created child VLU;

checking the most recently created child VLU to determine if the affected data blocks have been copied to the most recently created child VLU; propagating the affected data blocks to the most recently created child VLU if the affected data blocks have not been copied to the most recently created child VLU; and processing the WRITE operation.

3. The method of claim 2 wherein the search pointer and the propagation pointer of each parent VLU and each child VLU are implemented within an associated metadata structure organized as a tree of metadata slabs, each tree of metadata slabs including a plurality of slabs, each slab containing a metadata table having a plurality of entries, each entry represents a contiguous range of block addresses and contains a cache pointer to a slot of a random access memory, the slot storing a data block corresponding to the block address, a block address range indicator to indicate the contiguous range of block addresses, and at least one slab pointer, each slab pointer pointing to a parent slab or a child slab.

4. The method of claim 2 further comprising:
a) receiving a READ operation to a requested VLU, the READ operation affecting one or more data blocks;
b) checking the requested VLU to determine that the affected data blocks have not been copied to the requested VLU;
c) following the local search pointer to a subsequently created VLU or to the parent VLU;
d) checking the subsequently created VLU or the parent VLU for the affected data blocks;
e) repeating operations c) and d) until the requested data blocks are located; and
f) processing the READ request.

5. The method of claim 2 further comprising:
receiving a command to create a rollback to a specified time;
suspending the WRITE capability of the parent VLU;
creating a new VLU, the new VLU READ/WRITE-enabled and having a search pointer and a propagation pointer;
propagating all data blocks, from all child VLUs created subsequently to the specified time, to the new VLU, the propagation commencing with the most recently created child VLU, a most created copy of each data block copied to the new VLU; and
setting the search pointer of the new VLU to point to the parent VLU, and setting the propagation pointer of the new VLU set to NULL.

6. A machine-readable medium having one or more executable instructions stored thereon, which when executed by a digital processing system, cause the digital processing system to perform a method, the method comprising:
creating a READ/WRITE enabled parent virtual logical unit (VLU) to store an original data store;
creating one or more READ-only enabled child VLUs each storing a point-in-time copy of the original data store, the one or more child VLUs created at distinct times;
implementing a search pointer and a propagation pointer on the parent VLU and on each child VLU;
setting the search pointer of each child VLU to point to the next subsequently created child VLU, and set the search pointer of a most recently created child VLU to point to the parent VLU; and
setting the propagation pointer of each child VLU to point to the immediately previously created child VLU, and set the propagation pointer of the parent VLU to point to the most recently created child VLU.

7. The machine-readable medium of claim 6 wherein the method further comprises:
receiving a WRITE operation to the parent VLU, the WRITE operation affecting one or more data blocks of the parent VLU;
following the propagation pointer of the parent VLU to the most recently created child VLU;
checking the most recently created child VLU to determine if the affected data blocks have been copied to the most recently created child VLU;
propagating the affected data blocks to the most recently created child VLU if the affected data blocks have not been copied to the most recently created child VLU; and
processing the WRITE operation.

8. The machine-readable medium of claim 7 wherein the search pointer and the propagation pointer of each parent VLU and each child VLU are implemented within an associated metadata structure organized as a tree of metadata slabs, each tree of metadata slabs including a plurality of slabs, each slab containing a metadata table having a plurality of entries, each entry represents a contiguous range of block addresses and contains a cache pointer to a slot of a random access memory, the slot storing a data block corresponding to the block address, a block address range indicator to indicate the contiguous range of block addresses, and at least one slab pointer, each slab pointer pointing to a parent slab or a child slab.

9. The machine-readable medium of claim 7 wherein the method further comprises:
a) receiving a READ operation to a requested VLU, the READ operation affecting one or more data blocks;
b) checking the requested VLU to determine that the affected data blocks have not been copied to the requested VLU;
c) following the local search pointer to a subsequently created VLU or to the parent VLU;
d) checking the subsequently created VLU or the parent VLU for the affected data blocks;
e) repeating operations c) and d) until the requested data blocks are located; and
f) processing the READ request.

10. A machine-readable medium having one or more executable instructions stored thereon, which when executed by a digital processing system, cause the digital processing system to perform a method, the method comprising:
receiving a command to create a rollback to a specified time;
suspending the WRITE capability of the parent VLU;
creating a new VLU, the new VLU READ/WRITE-enabled and having a search pointer and a propagation pointer;
propagating all data blocks, from all child VLUs created subsequently to the specified time, to the new VLU, the propagation commencing with the most recently created child VLU, a most created copy of each data block copied to the new VLU; and
setting the search pointer of the new VLU to point to the parent VLU, and setting the propagation pointer of the new VLU set to NULL.

11. A data storage system comprising:
a storage media;
a processing system; and
a memory, coupled to the processing system, characterized in that the memory has stored therein instructions which, when executed by the processing system, cause the processing system to create a READ/WRITE enabled parent virtual logical unit (VLU) to store an original data store, create one or more READ-only enabled child VLUs each storing a point-in-time copy of the original data store, the one or more child VLUs created at distinct times, implement a search pointer and a propagation pointer on the parent VLU and on each child VLU, set the search pointer of each child VLU to point to the next subsequently created child VLU, set the search pointer of a most recently created child VLU to point to the parent VLU, set the propagation pointer of each child VLU to point to the immediately previously created child VLU, and set the propagation pointer of the parent VLU set to point to the most recently created child VLU.

12. The data storage system of claim 11 wherein the method further comprises:
receiving a WRITE operation to the parent VLU, the WRITE operation affecting one or more data blocks of the parent VLU;
following the propagation pointer of the parent VLU to the most recently created child VLU;
checking the most recently created child VLU to determine if the affected data blocks have been copied to the most recently created child VLU;
propagating the affected data blocks to the most recently created child VLU if the affected data blocks have not been copied to the most recently created child VLU; and
processing the WRITE operation.

13. The data storage system of claim 12 wherein the search pointer and the propagation pointer of each parent VLU and each child VLU are implemented within an associated metadata structure organized as a tree of metadata slabs, each tree of metadata slabs including a plurality of slabs, each slab containing a metadata table having a plurality of entries, each entry represents a contiguous range of block addresses and contains a cache pointer to a slot of a random access memory, the slot storing a data block corresponding to the block address, a block address range indicator to indicate the contiguous range of block addresses, and at least one slab pointer, each slab pointer pointing to a parent slab or a child slab.

14. The data storage system of claim 12 wherein the method further comprises:
a) receiving a READ operation to a requested VLU, the READ operation affecting one or more data blocks;
b) checking the requested VLU to determine that the affected data blocks have not been copied to the requested VLU;
c) following the local search pointer to a subsequently created VLU or to the parent VLU;
d) checking the subsequently created VLU or the parent VLU for the affected data blocks;
e) repeating operations c) and d) until the requested data blocks are located; and
f) processing the READ request.

15. A data storage system comprising:
a storage media;
a processing system; and
a memory, coupled to the processing system, characterized in that the memory has stored therein instructions which, when executed by the processing system, cause the processing system to perform a method, the method comprising:
receiving a command to create a rollback to a specified time;
suspending the WRITE capability of the parent VLU;
creating a new VLU, the new VLU READ/WRITE-enabled and having a search pointer and a propagation pointer;
propagating all data blocks, from all child VLUs created subsequently to the specified time, to the new VLU, the propagation commencing with the most recently created child VLU, a most created copy of each data block copied to the new VLU; and
setting the search pointer of the new VLU to point to the parent VLU, and setting the propagation pointer of the new VLU set to NULL.

16. A data storage apparatus comprising:
means for creating a READ/WRITE enabled parent virtual logical unit (VLU) to store an original data store;
means for creating one or more READ-only enabled child VLUs each storing a point-in-time copy of the original data store, the one or more child VLUs created at distinct times;
means for linking each child VLU such that each child VLU can direct a progress of a search to other child VLUs or the parent VLU; and
means for propagating data from the parent VLU to at least one of the child VLUs.

17. The data storage apparatus of claim 16 wherein means for linking includes:
means for implementing a search pointer and a propagation pointer on the parent VLU and on each child VLU;
means for setting the search pointer of each child VLU to point to the next subsequently created child VLU, and set the search pointer of a most recently created child VLU to point to the parent VLU; and
means for setting the propagation pointer of each child VLU to point to the immediately previously created child VLU, and set the propagation pointer of the parent VLU to point to the most recently created child VLU.

18. The apparatus of claim 17 further comprising:
means for receiving a WRITE operation to the parent VLU, the WRITE operation affecting one or more data blocks of the parent VLU;
means for following the propagation pointer of the parent VLU to the most recently created child VLU;
means for checking the most recently created child VLU to determine if the affected data blocks have been copied to the most recently created child VLU;
means for propagating the affected data blocks to the most recently created child VLU if the affected data blocks have not been copied to the most recently created child VLU; and
means for processing the WRITE operation.

19. The data storage apparatus of claim 18 wherein the search pointer and the propagation pointer of each parent VLU and each child VLU are implemented within an associated metadata structure organized as a tree of metadata slabs, each tree of metadata slabs including a plurality of slabs, each slab containing a metadata table having a plurality of entries, each entry represents a contiguous range of block addresses and contains a cache pointer to a slot of a random access memory, the slot storing a data block corresponding to the block address, a block address range indicator to indicate the contiguous range of block addresses, and at least one slab pointer, each slab pointer pointing to a parent slab or a child slab.

20. The data storage apparatus of claim 18 further comprising:
means for receiving a READ operation to a requested VLU, the READ operation affecting one or more data blocks;
means for checking the requested VLU to determine that the affected data blocks have not been copied to the requested VLU;
means for recursively following the local search pointer to a subsequently created VLU or to the parent VLU and recursively checking the subsequently created VLU or the parent VLU for the affected data blocks until the requested data blocks are located; and means for processing the READ request.

21. The apparatus of claim 18 further comprising:

means for receiving a command to create a rollback to a specified time;

means for suspending the WRITE capability of the parent VLU;

means for creating a new VLU, the new VLU READ/WRITE-enabled and having a search pointer and a propagation pointer;

means for propagating all data blocks, from all child VLUs created subsequently to the specified time, to the new VLU, the propagation commencing with the most recently created child VLU, a most created copy of each data block copied to the new VLU; and means for setting the search pointer of the new VLU to point to the parent VLU, and setting the propagation pointer of the new VLU set to NULL.

* * * * *